May 26, 1964    A. E. YELMGREN    3,134,328
PRINTING METHOD
Filed May 4, 1961
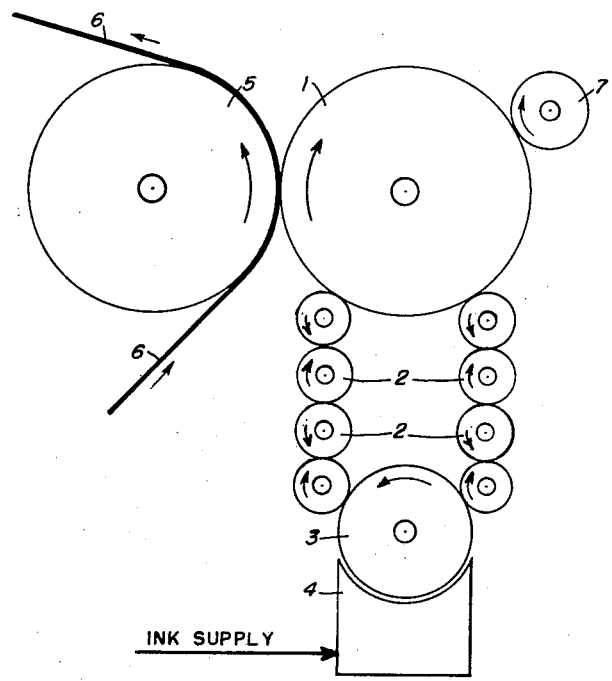
INK SUPPLY
INVENTOR
ALDEN E. YELMGREN
BY Fisher, Christen & Goodson
ATTORNEYS

3,134,328
PRINTING METHOD

Alden E. Yelmgren, Bethlehem Township, Easton, Northampton County, Pa., assignor to American Newspaper Publishers Association Research Institute, Inc., New York, N.Y., a corporation of Pennsylvania
Filed May 4, 1961, Ser. No. 107,792
1 Claim. (Cl. 101—426)

The present invention relates to a novel printing process and apparatus for the letterpress printing of paper and, more particularly, is directed to improvements in and to methods and apparatuses for printing newspapers.

Oil base inks are employed substantially universally by the newspaper publishing and allied industries for printing newspapers and the like on letterpress machinery. Present-day news inks essentially comprise a low-cost petroleum oil as a vehicle or carrier, carbon black as the pigment and a small amount of modifiers, e.g., a dispersing agent for adjusting the flow properties of the ink. Such oil-base inks are, for the most part, non-drying and accomplish their printing function by being absorbed by the paper being printed.

While the oil-base inks presently used to print newspapers served present-day purposes and were used by virtually all newspaper publishers, it was not because they were free of defects and disadvantages but only because such oil-base inks were the only economical inks available for newspaper letterpress printing. The principal drawbacks of oil-base inks, tolerated in the past are smudging and rub-off, strike-through, misting, and deteriorating effects on rubber parts of printing machinery. The problems of smudging, rub-off, and strike-through, are primarily due to the presence of the non-drying oil vehicle.

Misting is another characteristic of oil-base inks and is descriptive of the fine mist or fog of air-borne ink formed during the transfer of ink from the ink fountain via the distributing rollers to the letterpress printing plate. This ink mist circulates around the press room coating personnel, equipment and the room and all it contains with an oily film of ink. Misting, thus, presents conditions which must be closely confined so as to avert fire and health hazards and cannot be confined to avoid general housecleaning problems. Further fire and other hazards can be introduced inasmuch as solvents must be employed to remove mist-deposited ink from personnel, equipment and other objects in the press room.

Petroleum oils are well-known deteriorants for rubber and similar materials. The oil-base inks, thereby, are additionally objectionable in the degrading effect that they exhibit on rubber and similar materials.

One logical solution to the problems and objections involving the use of oil-base inks is to employ a water-base ink. Attempts to employ water-base inks have alleviated or eliminated some or most of the objectionable features of oil-base inks, but have failed to come into practical use because of the little understood phenomenon of "fill-in" which produces a partly filled-in mottled, speckled or blotchy appearance on or near solid, or almost solid (reverse dot half-tone) areas of the printed sheet.

The cause of this phenomena was little understood and was associated by many skilled workers in the art with a poorly prepared ink or improper press operation. At times the responsibility for this objectionable effect was placed on the type of pigment in the ink, and at other times the blame was put on the particular type of vehicle or carrier employed in the ink. In summary, the problem of fill-in has never been satisfactorily solved, and, as a result, water-base inks have been unsuitable, heretofore, for use in letterpress systems for printing newspapers and the like.

Therefore, a principal object of this invention is to provide a system, process and apparatus which minimizes or eliminates the problems of smudging, rub-off, strike-through, misting, equipment deterioration and other objectionable properties and effects of oil-base inks.

Another object is the provision of a system, process and apparatus for printing newspapers which are smudge-proof, less subject to strike-through and are clear unmottled, unspeckled, and free of objectionable blotching, especially in the solid or near-solid area, e.g., in the reverse dot and halftone areas.

Another object is the provision of a system, apparatus and process for printing newspapers wherein the hazards and possible hazards accompanying the use of oil-base inks are minimized or eliminated.

Another object is to provide an apparatus, process and system for printing newspapers employing water-base printing inks to result in printed newspapers which are free of objectionable fill-in, mottling etc.

This invention comprises a system, apparatus and process involving the use of water-base printing inks on letterpress equipment for printing newspapers and generally comprises the use of a mechanical brushing action on the letterpress plate after printing contact with the paper on the impression cylinder and prior to the re-application of ink from the ink fountain. The resulting printed newspaper is free of objectionable degrees of rub-off, smudging, fill-in, mottling, speckling, blotching, strike-through and the printing operation is substantially free of misting hazards and undue equipment deterioration.

The exact reason, theory or mechanics whereby the disadvantages of fill-in, mottling, speckling etc. (the usual drawbacks of using water-base inks on letterpresses) is not clearly understood. It is postulated in retrospect however, that, in printing newspapers on a letterpress using water-base inks, lint and minute fibers from the paper are attracted and held to the inked letterpress plate by virtue of the polar nature of the water contained by the ink. Also, due to the drying nature of water-base inks they partially dry on the plate surface to lock the lint and fibers on said surface. The lint and paper fibers continuously build up on the solid or near-solid areas of the plate covering up depressions in the plate and carry new ink to subsequent sheets resulting in a mottled, speckled, blotchy or filled-in effect.

The type of mechanical brushing employed in this invention is not narrowly critical and it can be rotating in the same or opposite direction as the letterpress plate cylinder or it can be stationary. The rotating brush provides more efficient action when rotating in the same rotational direction as the letterpress plate cylinder, and, thus, is preferred. The brush employed can be made of felt, fine brass bristles, bristles of natural or synthetic materials, e.g., nylon, although a steel wire or other wire bristle brush can be employed. A rotating brush peripherally contacting the letterpress plate cylinder and biased or braked to slow its rotational speed in relation to said cylinder also provides a better fill-in elimination than a rotary brush freely rotating with said cylinder. Also, motor-driven brushes turning at a different rotational speed than the cylinder are advantageously employed.

Any suitable water-base ink, of which many are known, can be used in this invention. For example, water-base inks comprise an aqueous vehicle (comprised in part of water), a pigment such as carbon black and a dispersing agent, e.g., lignins obtained as water extracts from woody materials including waste liquors, black liquors and/or green liquors obtained from paper-making processes. Lignins also function as a binding agent, drying down to a hard film, and as a bodying agent. Thus, lignins are advantageous because of their multiple role as dispersing agent, bodying agent and binding agent which binds the paper and pigment. In addition, it is also desirable to provide the water-base ink with a non-volatile agent, having a plasticizing effect to prevent the ink from drying down completely on press equipment and avoid adhesion of the paper web to the printing cylinder on prolonged standing. In general, any compatible, non-volatile, water-soluble, or water-miscible liquid can be used for this purpose and, in particular, the glycols including ethylene, diethylene, triethylene, propylene glycols and the like are satisfactory. This non-volatile agent after printing is usually used in such amounts satisfactorily absorbed by the paper to the extent that no smudging, tacking or rub-off problem occurs.

Thus, an illustrative water-base ink comprises water, a glycol, a binding, bodying and dispersing agent or agents, e.g., lignin; and carbon black as pigment. The following specific formulation is given as typical but not all inclusive of water-base inks which can be used:

| | Wt. percent |
|---|---|
| Carbon black | 10 |
| Lignin | 25 |
| Water | 25 |
| Diethylene glycol | 40 |
| | 100 |

Of course, other variations of this formulation can be made as are well known in the art. The specific ingredients and percentages thereof, can be changed to provide desired effects, e.g., the vehicle can comprise water only or anti-corrosive agents can be added to avoid corrosive effects on equipment. In addition, other pigments, dyes, and/or toners can be used instead of carbon black to provide colored effects as in comic strips, colored advertisements, colored pictures and the like. Further examples of water base inks are disclosed in U.S. Patent No. 2,449,230.

Having thus generally described this invention, one embodiment will now be described in conjunction with the appended drawings which is a schematic end elevation of a printing system and apparatus embodying the invention.

The single figure illustrates a letterpress printing machine including a letterpress plate cylinder 1 which peripherally engages end inking rolls 2 of a chain of inking rolls 2 cooperating with a main inking roll 3 to receive ink therefrom; an ink fountain 4 cooperating with said main inking roll to supply ink thereto (for example through transverse slots defining newspaper columns, the amount of ink passing through being controlled); and an impression cylinder 5 for carrying paper web or sheets 6 into contact with said plate cylinder and impressing said paper web or sheets on said plate cylinder. The detailed operation of such a letterpress printing machine is well known and generally involves the application of ink from the fountain 4 to the main inking roll 3, the transfer of ink therefrom to the inking rolls 2, in succession to the plate cylinder 1 where it is deposited on the raised portions of the printing surface of said plate cylinder, and from whence it is printed onto the paper 6 being delivered by the impression cylinder 5.

A rotary brush 7, preferably a nylon bristle, felt or fine brass wire brush, is mounted to peripherally engage and brush the printing surface of the plate cylinder 1 at a point after printing contact of said plate cylinder with the paper 6 carried by the impression cylinder 5 and prior to engagement with the inking rolls 2 for re-inking. The brush 7 is positively driven in the same rotational direction as the plate cylinder 1 so as to provide a more vigorous brushing action on the printing surface of said plate cylinder. Any suitable driving means such as an electric motor (not shown) is employed for positively driving the rotary brush 7.

The brush 7 can be positioned at any point subsequent to the impression cylinder 5 and prior to inking rolls 2, although it is desirable to position said brush in an operative location where any debris resulting from the brushing action is readily removed from the printing surface of the plate cylinder 5. A most advantageous location is at or below that point where the plate cylinder 5 has a substantially vertical tangent, whereby any debris from brushing falls away from said plate cylinder and, thus, is unlikely to be carried through the next re-inking and printing sequence.

This invention now makes it possible to eliminate, or at least largely minimize, the innate disadvantages and possible hazards of oil-base inks in the printing of mass publication media such as newspapers including news columns, comic strips, advertisements, pictorial matter, circulars and the like and provides new advantages never before obtained in the long history of the newspaper publishing industry. The invention has, thus, filled a long-felt need in this industry resolving problems and detriments long-tolerated because of no previous solution.

It is obvious that the invention can be practiced in many forms and on a wide variety of letterpress equipment. Many changes to the structure and arrangement of parts of the detailed embodiment described above can be made without departing from the scope and spirit of this invention.

What is claimed is:

In a process for printing mass publication media on web-fed paper having the characteristic of loosely held fibers on the surface thereof on a high-speed rotary letterpress wherein ink is applied to the surface of a revolving letterpress plate and the resulting inked plate is impressed on said paper to transfer ink thereto and thereby print said paper, that improvement in alleviating a mottled appearance of paper printed thereby with water-base inks, comprising, continually brushing the surface of said revolving plate after it is impressed on said paper and prior to re-application of said water-base ink, said brushing being accomplished by a brush mounted contiguous to said revolving plate and providing brushing action on the surface of said revolving plate by relative movement of said surface in respect to said brush.

References Cited in the file of this patent

UNITED STATES PATENTS

| 414,680 | Cottrell | Nov. 12, 1889 |
| 441,129 | Bradford | Nov. 25, 1890 |
| 511,934 | Cottrell | Jan. 2, 1894 |
| 1,114,893 | Lerche | Oct. 27, 1914 |
| 1,703,015 | Ratingnier | Feb. 19, 1929 |
| 1,858,909 | Trist | May 17, 1932 |
| 2,347,619 | Taylor et al. | Apr. 25, 1944 |
| 2,393,992 | Kauffeld | Feb. 5, 1946 |
| 2,510,388 | Dubuit | June 6, 1950 |

FOREIGN PATENTS

| 321,526 | Great Britain | Nov. 14, 1929 |
| 1,093,803 | Germany | Dec. 1, 1960 |